United States Patent [19]

Rausch

[11] 4,129,007

[45] Dec. 12, 1978

[54] ANCHOR DEVICE FOR RESIN ANCHOR SYSTEM

[75] Inventor: Paul G. Rausch, Parma, Ohio

[73] Assignee: Celtite, Inc., Cleveland, Ohio

[21] Appl. No.: 821,890

[22] Filed: Aug. 4, 1977

[51] Int. Cl.² .................... E21D 21/00; F16B 13/00
[52] U.S. Cl. ........................... 405/261; 52/698;
                                                 85/63; 151/41.7
[58] Field of Search ............. 85/1 H, 63; 151/41.7,
       151/69; 61/45 B, 63; 52/701, 709, 711, 698

[56] References Cited

U.S. PATENT DOCUMENTS

| | | | |
|---|---|---|---|
| 1,045,562 | 11/1912 | Kennedy | 52/711 X |
| 1,062,534 | 5/1913 | Butler | 52/711 X |
| 1,788,750 | 1/1931 | Snyder | 151/69 X |
| 2,403,541 | 7/1946 | Molat | 85/1 H UX |
| 2,592,791 | 4/1952 | Coberly | 151/69 UX |
| 3,877,235 | 4/1975 | Hill | 52/698 X |
| 3,896,627 | 7/1975 | Brown | 61/45 B |
| 4,023,373 | 5/1977 | Hipkins | 61/45 B |
| 4,051,683 | 10/1977 | Koval | 61/45 B |

FOREIGN PATENT DOCUMENTS

| | | | |
|---|---|---|---|
| 452191 | 11/1927 | Fed. Rep. of Germany | 85/1 H |
| 696231 | 8/1953 | United Kingdom | 151/69 |

Primary Examiner—Thomas J. Holko
Attorney, Agent, or Firm—Caesar, Rivise, Bernstein & Cohen, Ltd.

[57] ABSTRACT

An anchor device to be used in a hole with a bolt in connection with a cartridge containing a hardenable resin or other fast setting material. The bolt has a threaded shank and at least one lug means extending from the threaded shank. The anchor is an elongate cylindrical shell with a central passage to receive the bolt, thereby forming an anchor-bolt unit. The anchor has a first open end and a second closed end and also has an internally threaded portion for receiving the bolt. The bolt extends outwardly at the first end with the lug means of the bolt being located adjacent the closed second end of the anchor. The anchor-bolt unit is inserted in the hole after the cartridge has been inserted in the hole whereby when the bolt is rotated in a first sense there is a tendency to unthread the bolt from the anchor, but the bolt lug prevents complete withdrawal and instead the anchor is rotated to expel and mix the contents of the cartridge. After setting of the resin the bolt is rotated in a second sense so that the bolt penetrates into the anchor to tension the bolt.

10 Claims, 11 Drawing Figures

ANCHOR DEVICE FOR RESIN ANCHOR SYSTEM

Conventional roof bolting techniques involve the use of a steel bolt having a forged square head on one end, with the bolt having a threaded shank, generally of a ⅝ inch (1.6 cm.) diameter. The steel bolt is normally used in conjunction with an expandable mechanical anchor that has initial frictional contact with the bore hole and is expanded when the bolt is threaded into the anchor. Mechanical anchors have certain disadvantages, including questionable integrity of the anchor in soft or incompetent substrates.

Cartridges containing filled resins and hardeners are well known and are already in use to anchor steel bolts into rock or concrete substrates as a replacement for mechanical anchors. The use of the resin cartidges involves placing such cartridges in a bore hole and rupturing the cartridges with a steel bolt, rotating the bolt to mix the resin and hardener with the cured resin anchoring the bolt in the hole.

Because the steel bolt is used as a mixing device, it is necessary that the annular dimension between the bolt and the bore hole be held in a critical range in order to obtain correct mixing. Typical bore holes and roof bolting applications have 1 inch to 1⅜ inch diameters. The annulus established between holes of the aforesaid diameters and the standard ⅝ inch diameter roof bolt, is generally too large to produce correct mixing.

It is accordingly a prime objective of the present invention to introduce an anchor which is used in conjunction with the standard ⅝ inch diameter roof bolt to provide satisfactory mixing ability as well as providing optimum anchoring ability when tensioning the bolt.

Yet a further object of the present invention is to provide an anchor device at reasonable cost that can be used in conjunction with a cartridge containing a hardenable resin or other fast setting material.

Another object of the invention is to provide an anchor device which constitutes an anchor-bolt unit which is utilized to insure proper expelling and mixing of a cartridge containing a hardenable resin, followed by tensioning of the bolt after the resin has set.

The anchor device of the present invention performs two essential functions. First, the anchor device rotates with the bolt to mix the resin and the hardener provided in the cartridge. Once the resin is cured, the anchor device functions as a threaded anchor to allow the roof bolt to be tensioned.

The objectives of this invention are achieved by providing an anchor for use with the bolt wherein the bolt has a threaded shank with at least one lug means extending from the threaded shank or other means to prevent the bolt from unscrewing or withdrawing from the anchor. The anchor is an elongated shell which has a central passage to receive the bolt and the anchor has a first open end and a second closed end with the bolt extending outwardly of the first open end. The anchor also has an internally threaded portion for receiving the shank of the bolt. The aforesaid lug means of the bolt are located adjacent the closed end of the anchor. In use the bolt is threaded into the anchor through the aforesaid second end of the anchor and the lug or lugs are formed on the end of the threaded portion of the anchor. The second end of the anchor is then closed. A cartridge is placed in the hole and then the anchor-bolt combination is inserted into the hole in contact with the cartridge. The bolt is rotated in a first sense which tends to unthread and withdraw the bolt from the anchor, but the bolt lugs prevent complete withdrawal by engagement adjacent the shoulder defining the anchor central passage. Continued rotation of the bolt is transferred to the anchor so that the bolt and the anchor now rotate as one, thereby they exert a mixing action on the cartridge while rupturing the cartridge, such that the resin and the hardener are well mixed. The rotating action is then stopped so that the resin can set. After the resin has hardened. the bolt is then rotated in the opposite sense to penetrate into the anchor and to be tensioned.

Other objects and many other attendant advantages of the present invention become more readily apparent by reference to the various figures of the drawing wherein.

Figures 7, 8, 9:
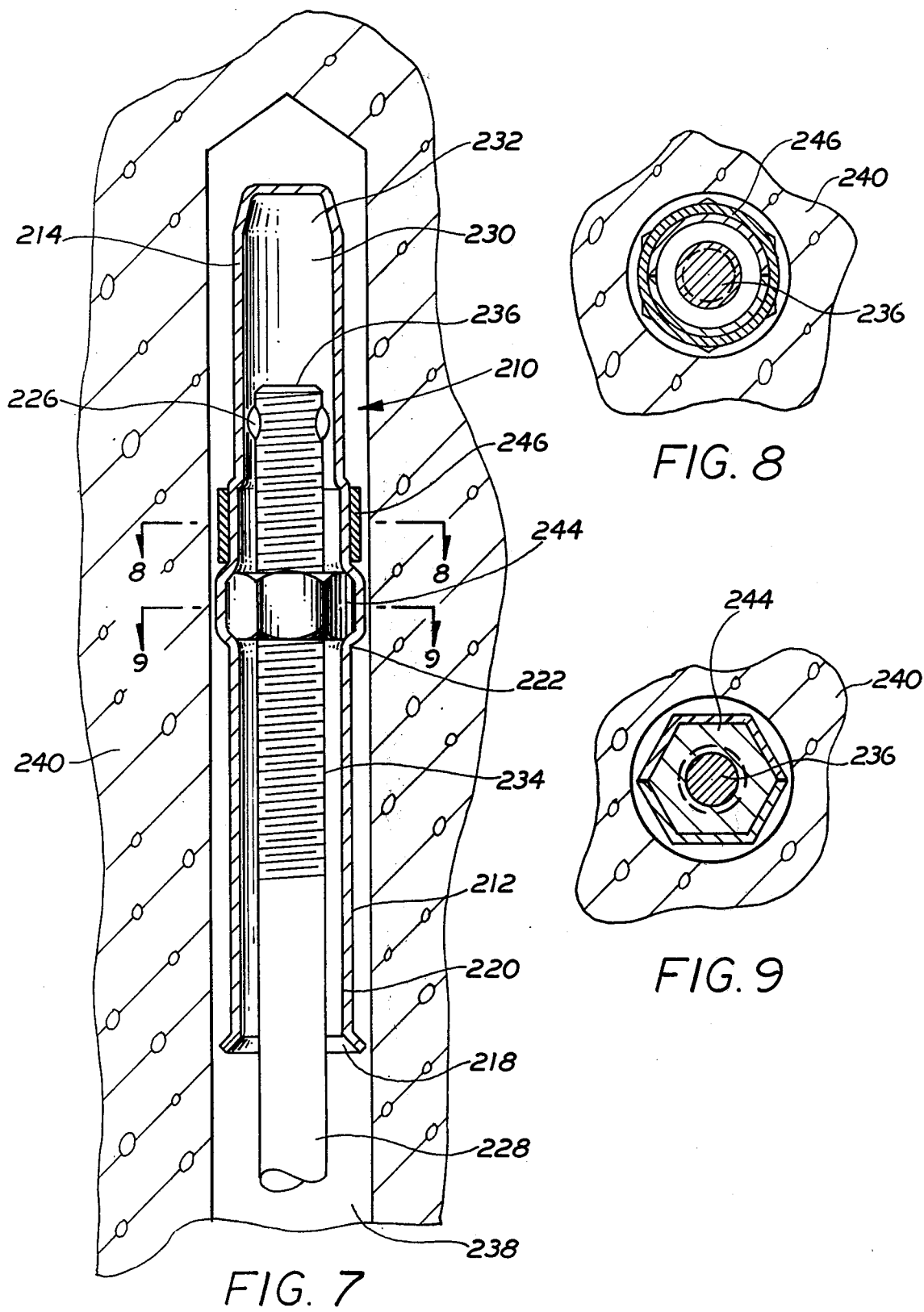
FIG. 7 is a sectional view showing another embodiment of the present invention wherein the anchor is formed from sheet metal in two halves or shells that enclose a standard hexagonal nut.
Figure 10:
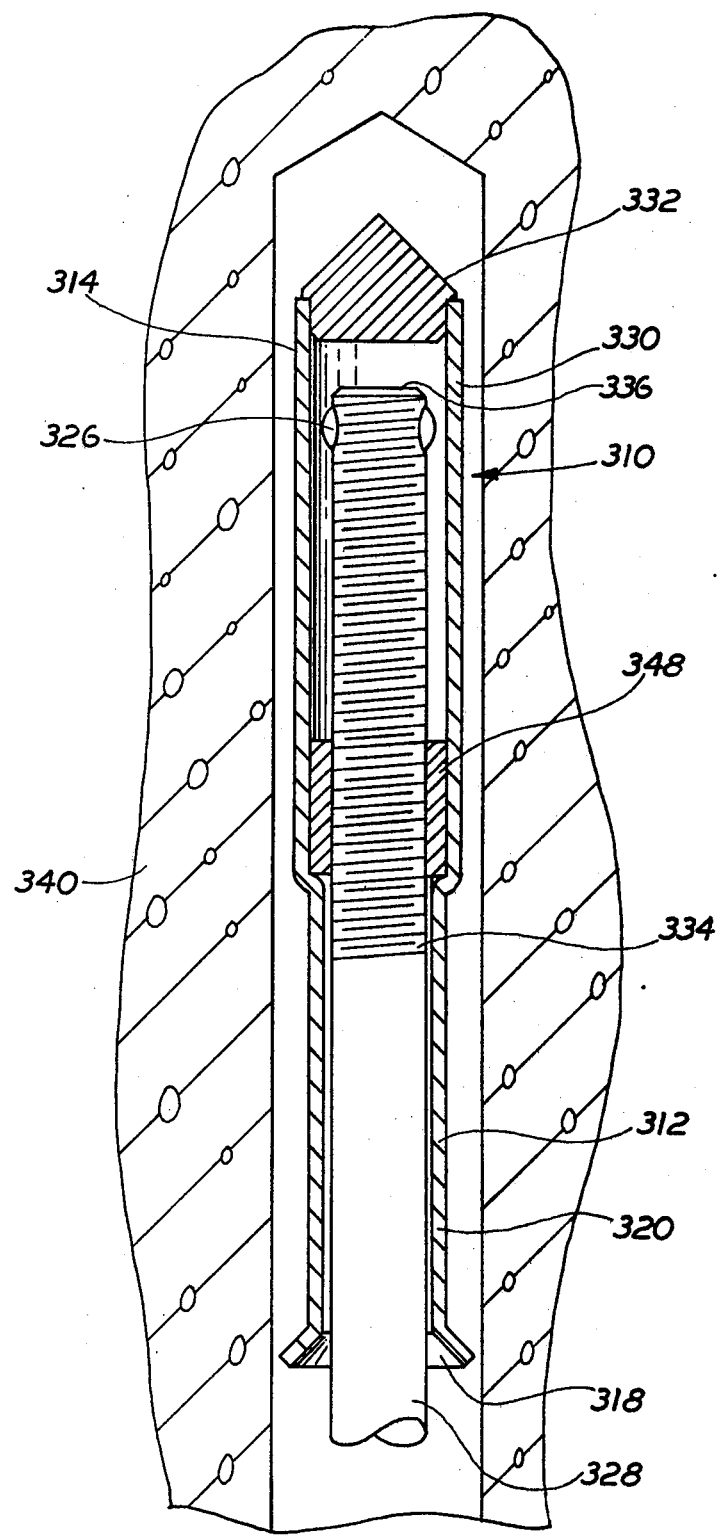

FIGS. 8 and 9 are respectively sectional views taken along the lines 8—8 and 9—9 of FIG. 7; and FIG. 10 is a sectional view showing yet another embodiment of the invention wherein the anchor is formed from tubing with a threaded insert secured by press fit or welding.

Figure 1:
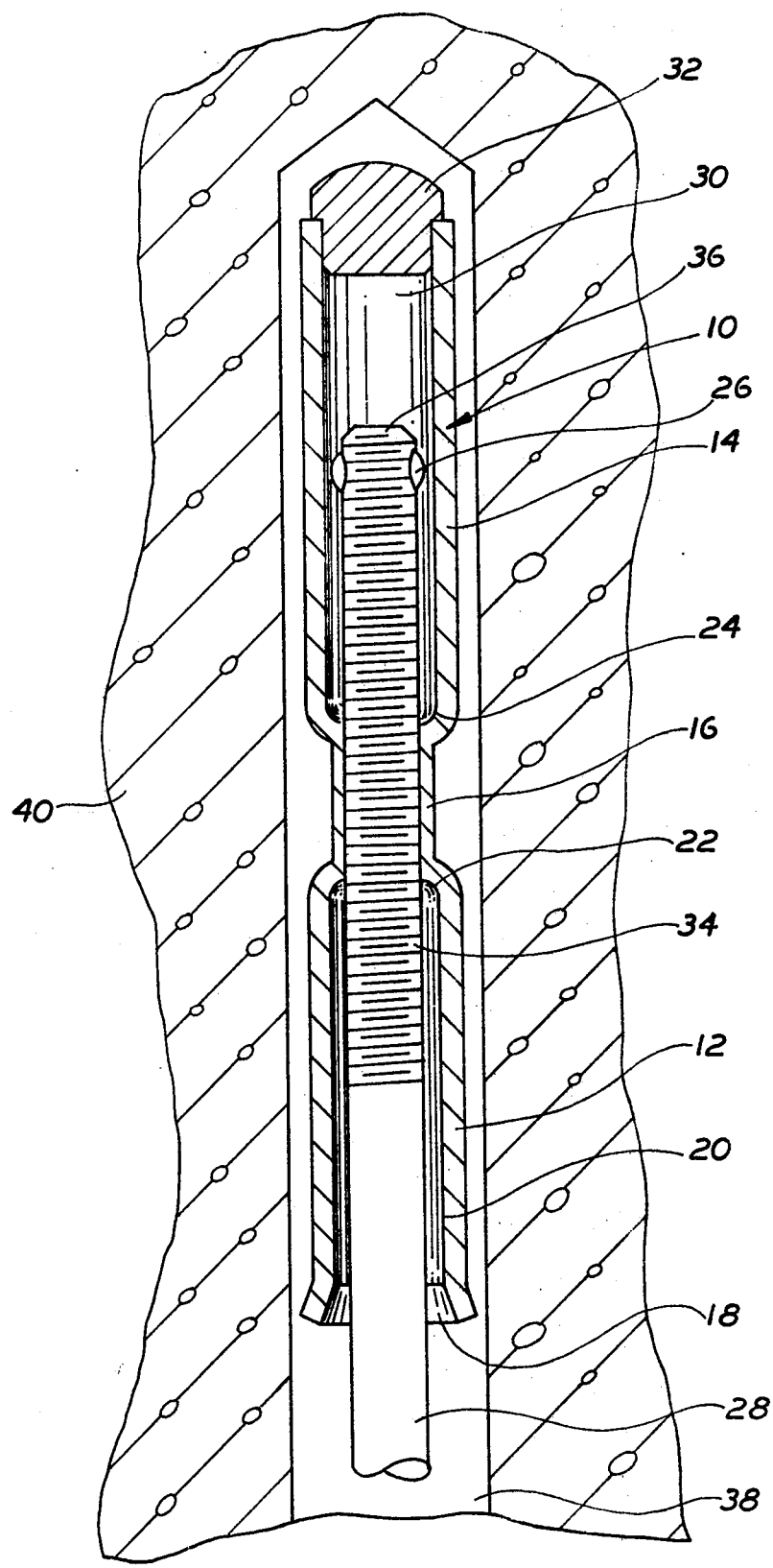
FIG. 1 is a sectional view showing a first embodiment of the anchor device of the present invention inserted in a hole.

Referring now in greater details to the various figures of the drawing wherein like reference characters refer to like parts, there is shown at 10 in FIG. 1 an anchor which is basically a cylindrical shell having a first section 12 and a second section 14 connected by threaded section 16. The first section 12 includes first opening 18 defined by inside diameter 20 which narrows at 22 as the threaded section 16 is approached.

The second section 14 is similar to the first section 12 including a shoulder 24 which is engaged by one or more lugs 26 of the bolt 28 as will be discussed hereinafter. The second section 14 has a second opening 30 which is closed by plug 32 after the bolt 28 has been inserted into the anchor 10 as will be discussed hereinafter.

The steel bolt 28 is the standard ⅝ inch diameter roof bolt that is threaded for a substantial portion 34 of its length and possesses one or more lugs 26 adjacent its inner end 36.

In use a bore hole 38 is drilled in the usual way in rock 40 or other substrate. The bolt 28 is usually preassembled in the anchor 10, but such assembly will now be described. In particular, the anchor 10 is provided with second opening 30 exposed and the bolt 28 threaded into the anchor 10 so that the threads of the bolt 28 are received in threaded section 16. Bolt 28 is threaded into the anchor 10 unitl the bolt end 36 protrudes sufficiently from the anchor 10 to permit the lugs 26 to be formed on it. Thereafter the plug 32 is inserted in place as shown in FIG. 1.

Figure 2:
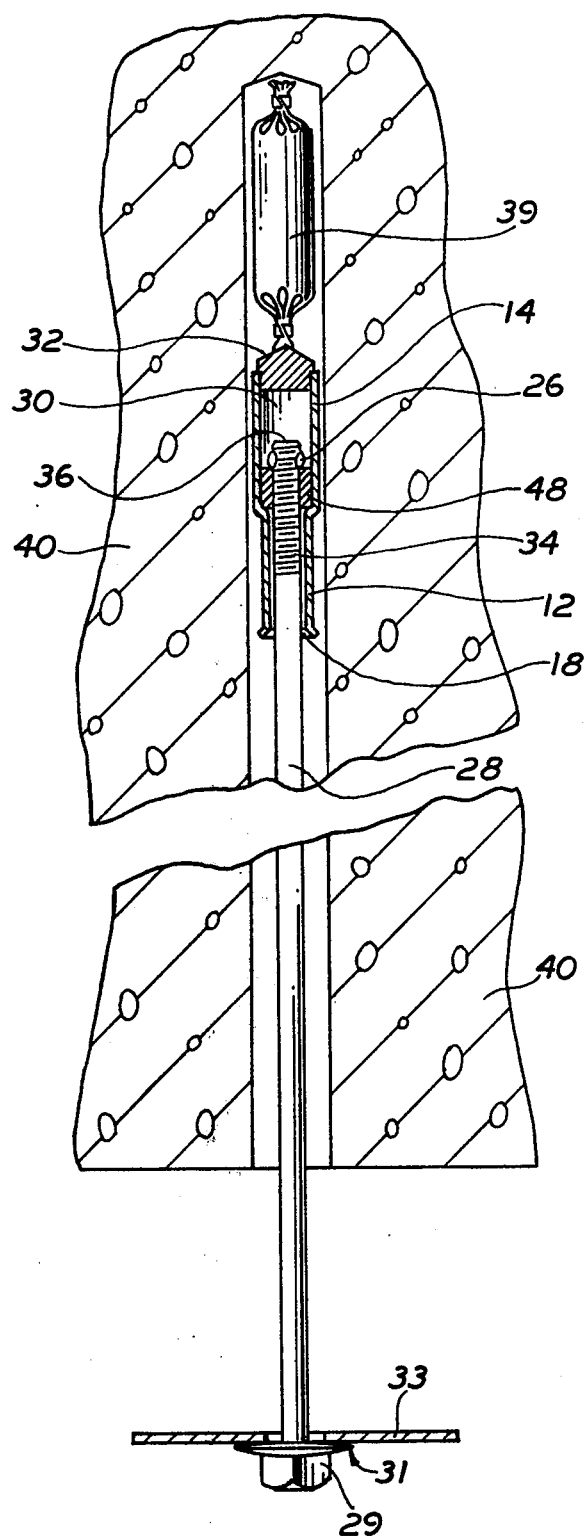
FIG. 2 is a view similar to FIG. 1 but showing an anchor of the type of FIG. 10, and by further showing the cartridge containing a hardenable resin which is essentially inserted in the hole followed by insertion of the anchor device of the present invention.

After bore 38 has been drilled in substrate 40, the cartridge 39 (FIG. 2) containing hardenable resin is inserted into the bore 38 followed by insertion of the anchor 10 — bolt 28 unit in the manner as shown in FIG. 2.

The bolt 28 is then rotated so that the bolt 28 is withdrawn from the anchor 10 until lugs 26 contact internal shoulder 24 of the anchor. The bolt 28 can no longer be withdrawn any further from the anchor and instead any further rotational action imparted to bolt 28 is transfered to anchor 10 which is then vigorously rotated to mix the resin constituents.

After the mixing time, the rotation of bolt 28 is stopped to allow the resin to cure. It should be noted that the presence of plug 32 as well as the shell-like configuration of the anchor 10 prevents the resin from contacting the bolt 28. The outer surface of the anchor 10 may be idented or scored to allow for a better hold on the part of the resin. The lower end of the anchor 10 has a larger diameter portion 18 which prevents the resin from freely flowing down in the hole away from the anchor.

Figure 3:
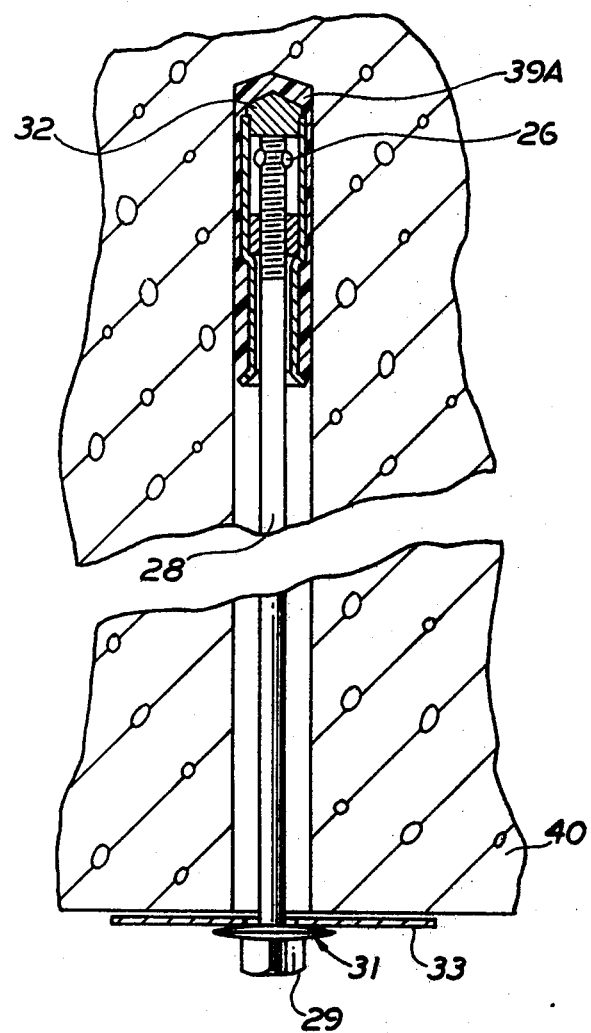
FIG. 3 is a view similar to FIG. 2 by wherein the anchor device has been completely installed in the hole, with the bolt having been tensioned.
Figure 4:
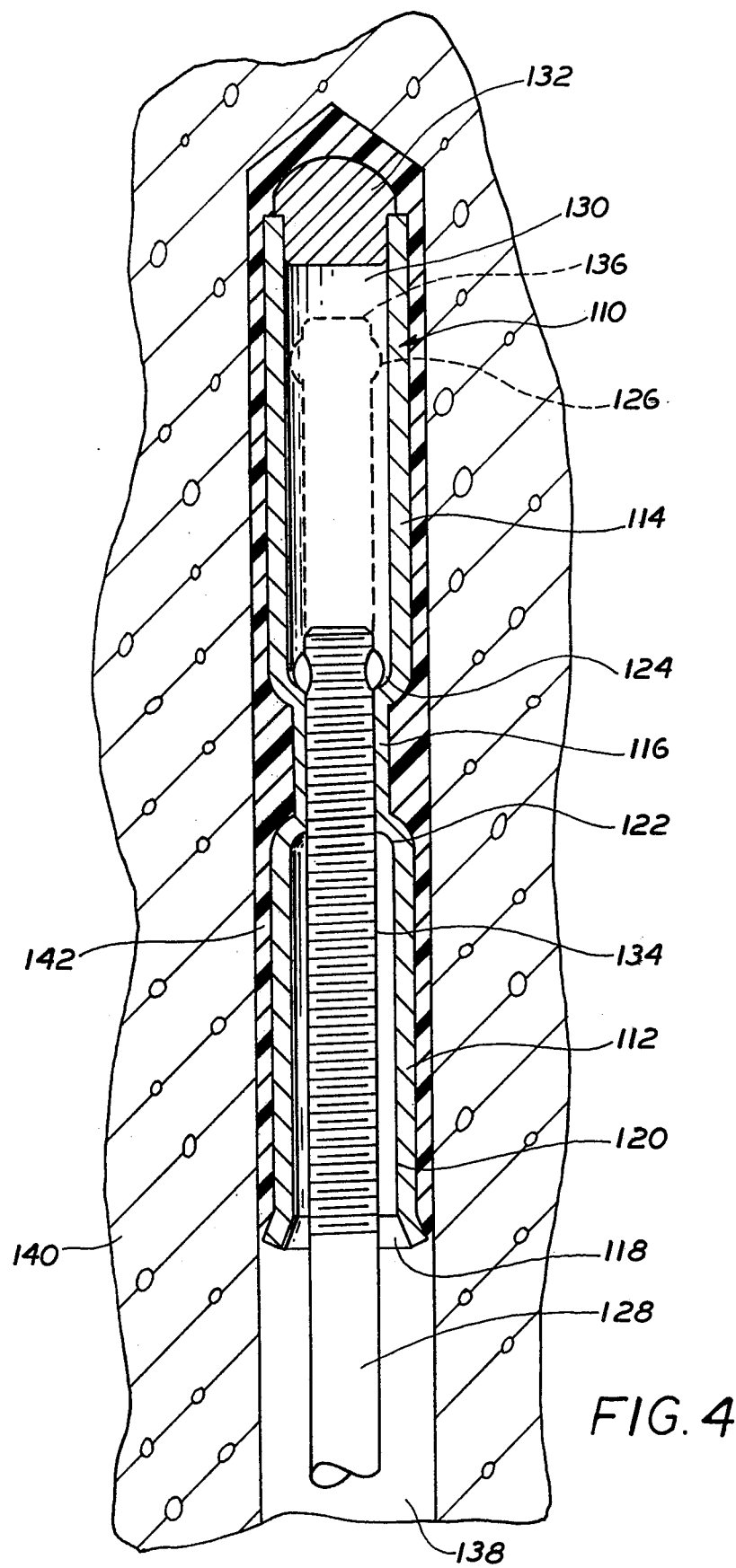
FIG. 4 is a sectional view similar to FIG. 1 but showing in phantom the original position of the bolt prior to rotation away from the plug.

After the resin is cured, the bolt is then rotated in a reverse direction to tension the bolt as shown in FIG. 3.

As can be seen in FIGS. 2 and 3 the cartridge 39 is closed and its contents 39-A are expelled. A cartridge usuable with the present invention is exemplified by cartridges in U.S. Pat. Nos. 3,731,791 and 4,019,630.

Figures 5, 6, 6A:
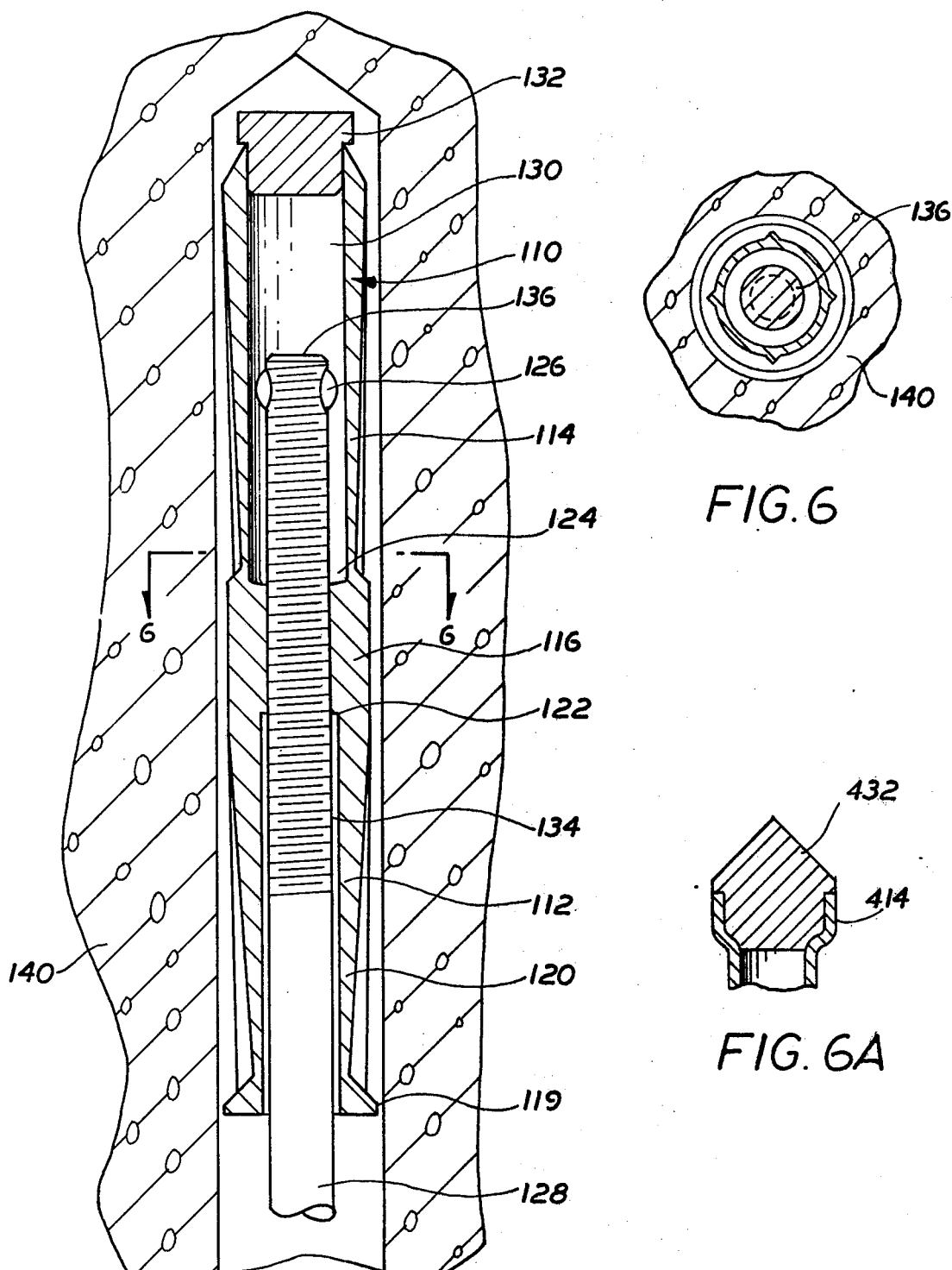
FIG. 5 shows an anchor device similar to FIG. 1 except that it is made from a metal casting.
FIG. 6 is a sectional view taken along the lines 6—6 of FIG. 5.
FIG. 6A is an enlarged detail view showing an alternative construction for holding the plug.

FIG. 5 shows an anchor device similar to FIG. 1 except the device 110 of FIG. 5 is made from a metal casting. Except for this, the reference numerals on FIG. 5 are similar to those on the previous drawings except that the FIG. 5 (and FIG. 6) reference numerals start with the number 110 as indicating the anchor generally.

Yet another embodiment of the present invention is shown in FIGS. 7, 8 and 9 wherein the anchor if formed from sheet metal in two halves or shells that enclose standard hexagonal nut 244. The two anchor halves are formed with a top-end closure and are secured to nut 244 through the use of metal ring 246 that is pressed or otherwise tightened into place.

Still another embodiment of the invention is shown in FIG. 10 wherein the anchor is formed from tubing with the threaded insert 348 secured by press fit or welding.

From the foregoing it can be seen that in all embodiments of the invention there is a central threaded section for bolt engagement. The internal anchor portion above the central threaded section is fully enclosed to prevent the entrance of resin and provides clearance for the bolt to be threaded into the anchor during tensioning.

There is also the sufficient length of anchor below the central threaded section to prevent the ingress of resin.

In each embodiment of the invention there is the flared end on the bottom of the anchor that establishes the very narrow clearance with the bore hole to restrict the flow of resin in the area and to confine the resin to the anchor's bottom surface. This tends to minimize voids in the resin.

Moreover, the exterior of the anchor has sections of reduced cross sections or tapered sections to promote a better mechanical locking.

The length of the anchor above or below the threaded central section can be lengthened to provide increased bolt travel for tensioning or increased anchorage capacity. The exterior surface of the anchor can be scored, embossed, sand blased or otherwise treated to improve bonding between the anchor and resin.

In use the resin cartridge normally has a cure time from 20 seconds to 5 minutes. Thus, with the present invention mixing of the resin components occurs quickly so that the cure of the resin will immediately follow. After the resin has hardened the bolt is rotated to penetrate into the anchor and tension the bolt.

The bolt and the various anchors of this invention are made of steel or iron, but other materials, such as high strength plastic are contemplated.

In many instances the plug 32 is simply inserted into the second section 14 of the anchor as illustrated in the various figures of the drawing. However, it is contemplated that the open end of second section 14 be flared outwardly as illustrated in FIG. 6A to accommodate the plug 32 in a positive seating arrangement and contribute to the mechanical locking capability of the anchor. Here the section section is identified as 414 and the plug as 432.

Without further elaboration the foregoing will so fully illustrate my invention that other may, by applying current or future knowledge, readily adapt the same for use under various conditions of service.

What is claimed as the invention is:

1. An anchor for use in a hole with a bolt and cartridge containing hardenable resin, said bolt having a threaded shank and having at least one lug means extending from said threaded shank, said anchor being an elongate cylindrical shell and having a central passage to receive said bolt, to form an anchor-bolt unit, said anchor having a first open end and a second closed end, said bolt extending outwardly of said first open end, said anchor also having an internally threaded portion for receiving said bolt, said bolt lug means being located adjacent said closed second end of said anchor, said anchor-bolt unit being inserted in said hole and said cartridge also being inserted in said hole whereby when said bolt is rotated in a first sense to tend to withdraw said bolt from said anchor, said bolt lug means prevents complete withdrawal and instead said anchor is rotated, thereby to expel and mix the contents of said cartridge and thereafter said bolt may be rotated after setting of the resin in a second sense so that said bolt penetrates into said anchor to tension the bolt.

2. The anchor of claim 1 wherein said bolt has a $\frac{5}{8}$ inch (1.6 cm.) diameter.

3. The anchor of claim 1 wherein the second closed end is closed by a plug.

4. The anchor of claim 3 wherein said second closed end is flared outwardly.

5. The anchor of claim 1 wherein said elongate cylindrical shell is formed from a metal casting.

6. The anchor of claim 1 wherein said elongate shell is formed from sheet metal in two halves.

7. The anchor of claim 6 wherein said two halves enclose a standard hexagonal nut.

8. The anchor of claim 7 wherein said two halves are formed with a top-end closure.

9. The anchor of claim 8 wherein said two anchor halves are secured to said nut through the use of a metal ring secured about said two halves.

10. The anchor of claim 1 wherein said elongate shell is formed from tubing and has a threaded insert secured in place.

* * * * *